(12) United States Patent
Li et al.

(10) Patent No.: US 11,549,489 B2
(45) Date of Patent: Jan. 10, 2023

(54) PITCH CONTROL METHOD AND SYSTEM OF SYMMETRICAL-AIRFOIL VERTICAL AXIS WIND TURBINE

(71) Applicant: Anhui University of Science and Technology, Huainan (CN)

(72) Inventors: Liang Li, Huainan (CN); Laiwang Jing, Huainan (CN); Jianqiang Wu, Huainan (CN); Long Wang, Huainan (CN); Guanghong Miao, Huainan (CN)

(73) Assignee: Anhui University of Science and Technology, Huainan (CN)

( * ) Notice: Subject to any disclaimer, the term of this patent is extended or adjusted under 35 U.S.C. 154(b) by 56 days.

(21) Appl. No.: 17/334,260

(22) Filed: May 28, 2021

(65) Prior Publication Data
US 2021/0372372 A1    Dec. 2, 2021

(30) Foreign Application Priority Data
Jun. 1, 2020 (CN) .......................... 202010484511.0

(51) Int. Cl.
*F03D 7/06* (2006.01)
*F03D 3/00* (2006.01)

(52) U.S. Cl.
CPC .............. *F03D 7/06* (2013.01); *F03D 3/005* (2013.01); *F05B 2200/12* (2013.01); *F05B 2200/13* (2013.01); *F05B 2200/211* (2013.01); *F05B 2200/261* (2013.01); *F05B 2200/262* (2013.01); *F05B 2200/263* (2013.01); *F05B 2270/32* (2013.01); *F05B 2270/321* (2013.01); *F05B 2270/327* (2013.01); *F05B 2270/328* (2013.01);

(Continued)

(58) Field of Classification Search
CPC ...... F03D 3/005; F03D 7/0204; F03D 7/0224; F03D 7/042; F03D 7/06; F03D 17/00; F05B 2240/211–218; F05B 2260/71; F05B 2270/32; F05B 2270/321; F05B 2270/327; F05B 2270/328; F05B 2270/329; Y02E 10/74
See application file for complete search history.

(56) References Cited

U.S. PATENT DOCUMENTS

2011/0006526 A1* 1/2011 Hemmingsson ........ F03D 3/068
  290/44
2021/0372372 A1* 12/2021 Li ........................... F03D 3/005

\* cited by examiner

*Primary Examiner* — Christopher R Legendre
(74) *Attorney, Agent, or Firm* — Johnson, Marcou, Isaacs & Nix, LLC

(57) ABSTRACT

A pitch control method and system of a symmetrical-airfoil vertical axis wind turbine collects data by an anemometer, an anemoscope and an angle sensor, outputs an optimum pitch angle based on a control law of a pitch angle and controls the pitch angle to be the optimum pitch angle through a pitch control actuator. In addition to input variables of the control law such as a wind velocity $v_{in}$ and a blade azimuth angle $\Psi$, constants such as a rotation radius R, a rotation velocity $\Omega$ of the blade and aerodynamic coefficients $c_1$, $c_2$ and $c_3$ are also related. A Reynolds number has little influence on three aerodynamic coefficients $c_1$, $c_2$ and $c_3$. The pitch actuator controls the adjustment rods to realize the automatic pitch control of the blades. An expression of the control law of the pitch is concise, the calculation time is short, and a response speed is fast.

3 Claims, 2 Drawing Sheets

(52) U.S. Cl.
CPC ... *F05B 2270/329* (2013.01); *F05B 2270/604* (2013.01)

PITCH CONTROL METHOD AND SYSTEM OF SYMMETRICAL-AIRFOIL VERTICAL AXIS WIND TURBINE

CROSS REFERENCE TO RELATED APPLICATION

This patent application claims the benefit and priority of Chinese Patent Application No. 202010484511.0, with title "Pitch Control Method and System of Symmetrical-Airfoil Vertical Axis Wind Turbine", filed on Jun. 1, 2020, the disclosure of which is incorporated by reference herein in its entirety.

TECHNICAL FIELD

The present disclosure relates to the technical field of pitch control of a wind turbine, in particular to a pitch control method and system of a symmetrical-airfoil vertical axis wind turbine.

BACKGROUND OF THE INVENTION

A rotation shaft of a wind wheel of a vertical axis wind turbine is perpendicular to the ground or an air flow, and there is no need to make the wind wheel face the wind when a wind direction changes. Compared with a horizontal axis wind turbine, the vertical axis wind turbine not only has a simple structure, but also reduces a gyroscope force of the wind wheel when the wind wheel faces the wind. However, for the vertical axis wind turbine, there are shortcomings such as poor self-starting ability and low wind energy utilization ratio. The pitch control is an effective measure to optimize the aerodynamic performance and wind energy utilization ratio of the vertical axis wind turbine.

In the prior art, there are a large number of pitch control methods for horizontal axis wind turbines. However, because an operation mode of the horizontal axis wind turbine is different from that of the vertical axis wind turbine, the large number of pitch control methods cannot be directly applied to the vertical axis wind turbine. At present, pitch control methods used by the vertical axis wind turbine mainly include: (1) adjusting based on a periodically variable pitch angle which is provided by an eccentric mechanism; (2) controlling in real-time based on an optimal pitch angle determined by numerical simulation and optimization algorithms. An adjustment of the eccentric mechanism usually has poor automaticity. For the real-time adjustment by the optimization algorithm, if an iterative algorithm is complicated, a lag of the pitch control will occur easily; and the real-time adjustment is mostly set according to wind conditions under a specific Reynolds number, which lacks universality.

The present patent application with publication number CN102889177A discloses a variable pitch angle structure of an H-type vertical axis wind power generation system and a control method thereof, which improves the self-starting ability and the tangential force of the vertical axis wind turbine by collecting a wind direction signal and a wind velocity signal as well as blade position signals in real time, comparing the wind velocity and a predetermined tangential wind velocity, and providing a result of pitch control with reference to the wind direction. However, the control logic of the control method is relatively complicated, and the control method has a long response time and a lag problem existing in the pitch control.

SUMMARY OF THE INVENTION

A technical problem to be solved by the present disclosure is to provide a pitch control method and system of a symmetrical-airfoil vertical axis wind turbine with a straight blade and a high tip-speed-ratio.

The present disclosure solves the above technical problem through the following technical solutions: a pitch control method for a symmetrical-airfoil vertical axis wind turbine. The wind turbine includes a connecting rod. Two ends of the connecting rod are provided with symmetrical blades respectively. A center of the connecting rod is provided with a rotation shaft vertical to the ground. The rotation shaft is provided with a pitch actuator for controlling the blades. The pitch actuator is provided with adjustment rods connected with the blades. The wind turbine is further provided with an anemoscope and an anemometer, and the connecting rod is provided with an angle sensor. An expression of an optimum pitch angle of the pitch actuator is determined by:

$$\theta_p = \Gamma - \frac{2c_2 - \sqrt{4c_2^2 - 12c_1c_3\tan^2\Gamma}}{6c_3\tan\Gamma}.$$

where $\theta_p$ is the optimal pitch angle, $$\Gamma = \arctan\frac{\cos\Psi}{\sin\Psi - \lambda},$$

$\Psi$ is a blade azimuth angle which is an angle by which a direction of wind rotates counterclockwise to an inside normal of a airfoil circumference. The blade azimuth angle is obtained by values from the anemoscope and the angle sensor.

$$\lambda = \frac{R\Omega}{v_{in}}$$

is a tip speed ratio, R is a rotation radius of the blades, $\Omega$ is a rotation velocity of the blades. $v_{in}$ is a wind velocity, which represents a value of the anemometer.

$c_1$, $c_2$ and $c_3$ are aerodynamic coefficients in a lift coefficient expression $C_L(\alpha)=c_1\alpha+c_3\alpha^3$ and a drag coefficient expression $C_D(\alpha)=c_0+c_2\alpha^2$. $\alpha$ is an attack angle, which represents an angle between a relative wind velocity $v_r$ and an airfoil chord line, $v_r=v_{in}-R\Omega$. The pitch angle obtained according to the control law is output to the pitch actuator; and the pitch actuator controls the adjustment rods to perform the pitch control on the blades.

Input variables of the expression used in the present disclosure are a wind velocity $v_{in}$ and a blade azimuth angle $\Psi$. In addition to these two variables, the expression is also related to constants such as a rotation radius R, a rotation velocity $\Omega$ of the blade and aerodynamic coefficients $c_1$, $c_2$ and $c_3$. It is known from common aerodynamic experimental data of the airfoil that a Reynolds number has little influence on the three aerodynamic coefficients $c_1$, $c_2$ and $c_3$, so this control law of the optimal pitch angle is suitable for various wind conditions. The blade azimuth angle $\Psi$ can be obtained by the values of the anemoscope and the angle sensor. The wind velocity $v_{in}$ can be directly obtained by the anemometer. A calculation result is output to the pitch actuator, and the pitch actuator controls the adjustment rods to realize the automatic pitch control of the blades, thereby improving universality of pitch control of the blades under different wind conditions. The expression of the optical pitch angle is concise, the calculation time is short, and the response speed is fast, thereby overcoming a defect of the lag of pitch control.

In some embodiments, the adjustment rods are hydraulic telescopic rods, and a signal output end of the pitch actuator is communicatively connected with a hydraulic system.

Also provided is a pitch control system of a symmetrical-airfoil vertical axis wind turbine. The wind turbine includes a connecting rod; two ends of the connecting rod are provided with symmetrical blades, respectively. A center of the connecting rod is provided with a rotation shaft vertical to the ground. The rotation shaft is provided with a pitch actuator for controlling the blades. The pitch actuator is provided with adjustment rods connected to the blades. The wind turbine is further provided with an anemoscope and an anemometer. The connecting rod is provided with an angle sensor; signal output ends of the anemoscope, the anemometer and the angle sensor are in communication connection with a controller. A signal output end of the controller is in communication connection with the pitch actuator; and the controller outputs an optimal pitch angle based on a data output collected by the anemoscope and the anemometer. The expression of the optical pitch angle controlled by the controller is determined by:

$$\theta_p = \Gamma - \frac{2c_2 - \sqrt{4c_2^2 - 12c_1c_3\tan^2\Gamma}}{6c_3\tan\Gamma}.$$

Where $\theta_p$ is the optimal pitch angle.

$$\Gamma = \arctan\frac{\cos\Psi}{\sin\Psi - \lambda},$$

$\Psi$ is a blade azimuth angle, which is an angle by which a direction of wind rotates counterclockwise to an inside normal of an airfoil circumference.

$$\lambda = \frac{R\Omega}{v_{in}}$$

is a tip speed ratio, R is a rotation radius of the blades, $\Omega$ is a rotation velocity of the blades, $v_{in}$ is a wind velocity.

$c_1$, $c_2$, and $c_3$ are aerodynamic coefficients in a lift coefficient expression $C_L(\alpha)=c_1\alpha+c_3\alpha^3$ and a drag coefficient expression $C_D(\alpha)=c_0+c_2\alpha^2$, where $\alpha$ is an attack angle, which represents an angle between a relative wind velocity $v_r$ and an airfoil chord line, $v_r=v_{in}-R\Omega$.

The pitch control method and system of a symmetrical-airfoil vertical axis wind turbine, provided by the present disclosure, has the following advantages. Input variables of the used expression are a wind velocity $v_{in}$ and a blade azimuth angle $\Psi$. In addition to these two variables, the expression is also related to constants such as a rotation radius R, a rotation velocity $\Omega$ of the blade and aerodynamic coefficients $c_1$, $c_2$ and $c_3$. It is known from common aerodynamic experimental data of the airfoil that Reynolds number has little influence on the three aerodynamic coefficients $c_1$, $c_2$ and $c_3$. Therefore, this control law of the optical pitch angle is suitable for various wind conditions.

The blade azimuth angle $\Psi$ can be obtained by parameters of the anemoscope and the angle sensor, and the wind velocity $v_{in}$ can be directly obtained by the anemometer. A calculation result is output to the pitch actuator, and the pitch actuator control the adjustment rods to realize the automatic pitch control of the blades, thereby improving universality of pitch control of the blades under different wind conditions. The expression of the optical pitch angle is concise, the calculation time is short, and the response speed is fast, thereby overcoming a defect of the lag of pitch control.

DETAILED DESCRIPTION OF THE EMBODIMENTS

In order to make the objectives, technical solutions and advantages of the present disclosure clearer, the present disclosure will be further described in detail below in conjunction with specific embodiments and with reference to the accompanying drawings.

Figure 1:
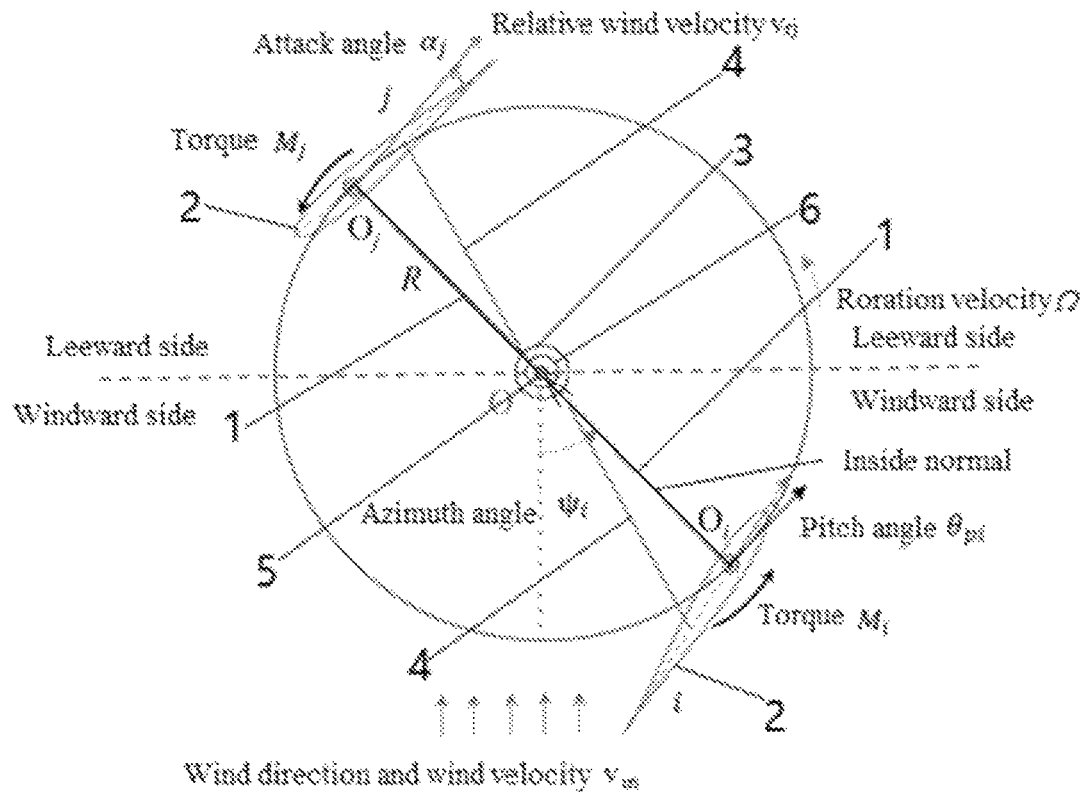
FIG. 1 is a model diagram of a wind turbine according to an embodiment of the present disclosure.
Figure 2:
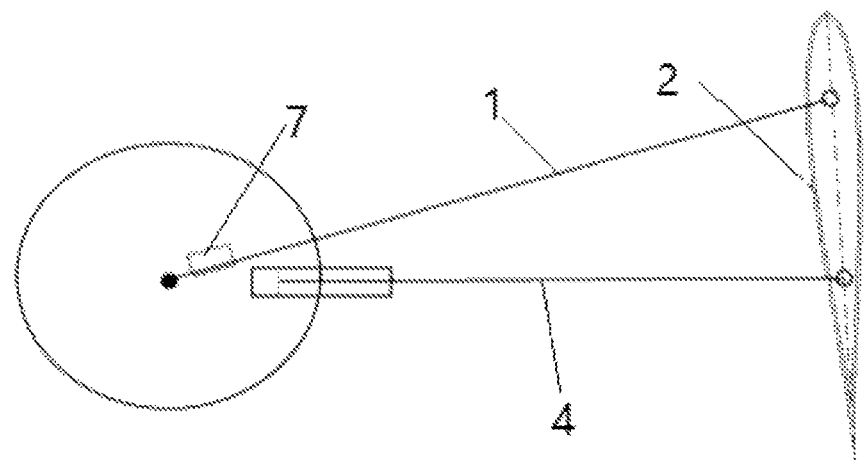
FIG. 2 is a model diagram of a structure of controlling a pitch according to an embodiment of the present disclosure.

The present embodiment provides a pitch control method of a symmetrical-airfoil vertical axis wind turbine. A simplified model for the wind turbine is shown in FIG. 1. The wind turbine includes a connecting rod 1. Two ends of the connecting rod 1 are provided with symmetrical blades 2. A center of the connecting rod 1 is provided with a rotation shaft (not shown) vertical to the ground. The rotation shaft is provided with a pitch actuator 3 for controlling the blades 2. The pitch actuator 3 is provided with adjustment rods 4 connected with the blades 2. The blade 2 is hingedly coupled with the connecting rod 1 and the adjustment rod 4. The adjustment rod 4 is telescopic so as to change a length thereof. The wind turbine is also provided with an anemoscope 5 and an anemometer 6. In combination with FIG. 2, the connecting rod 1 is provided with an angle sensor 7. In this way, solving a control law of pitch control is converted into solve a maximum value of an airfoil pneumatic torque. The airfoil pneumatic torque is expressed as:

$$M=\tfrac{1}{2}c\rho_a v_r^2 R\{[c_1(\Gamma-\theta_p)+c_3(\Gamma-\theta_p)^3]\sin\Gamma-[c_0+c_2(\Gamma-\theta_p)^2]\cos\Gamma\} \quad \text{(expression 1)}$$

The maximum value satisfies a condition $$\frac{dM}{d\theta_p} = 0 \text{ and } \frac{d^2M}{d(\theta_p)^2} < 0.$$

Where M is the airfoil pneumatic torque, $\theta_p$ is an optimal pitch angle, c is a chord length of an airfoil, $\rho_a$ is a density of air; $v_r$ is a relative wind velocity, a calculation expression of the relative wind velocity is $v_r=v_{in}-R\Omega$, where a bold font ($v_r$, $v_{in}$ and $\Omega$) represents a vector and a non-bold font (R) represents a value; $v_{in}$ is a wind velocity, which is obtained by measurement of the anemometer 6; R is a rotation radius, $\Omega$ is a rotation velocity;

$$\Gamma = \arctan\frac{\cos\Psi}{\sin\Psi - \lambda},$$

where Ψ is a blade azimuth angle, i.e., an angle by which a wind direction rotates counterclockwise to an inner normal of a circumference formed by an airfoil; and the blade azimuth angle can be obtained by values of the anemoscope 5 and the angle sensor 7;

$$\lambda = \frac{R\Omega}{v_{in}}$$

is a tip velocity ratio.

$c_1$, $c_2$ and $c_3$ are aerodynamic coefficients in a lift coefficient expression $C_L(\alpha)=c_1\alpha+c_3\alpha^3$ and a drag coefficient expression $C_D(\alpha)=c_0+c_2\alpha^2$, these coefficients can be referred to published data, or be obtained by test data of an airfoil or CFD (Computational Fluid Dynamics) calculation data; α is an attack angle, which represents an angle between the relative wind velocity $v_r$ and a chord line of an airfoil.

An expression of an optimum pitch angle solved is:

$$\theta_p = \Gamma - \frac{2c_2 - \sqrt{4c_2^2 - 12c_1c_3\tan^2\Gamma}}{6c_3\tan\Gamma} \quad \text{(expression 2)}$$

The pitch angle obtained according to the expression 2 is output to the pitch actuator 3. The pitch actuator 3 controls the adjustment rods 4 to perform the pitch control of the blades 2.

The adjustment rod 4 is preferably a hydraulic telescopic rod. A signal output end of the pitch actuator 3 is in communication with a hydraulic system. The pitch actuator 3 outputs a signal to control an action of a hydraulic pressure, thereby changing lengths of the adjustment rods 4 to achieve the pitch control of the blades 2.

In the present embodiment, a pitch angle corresponding to a maximum value of the airfoil aerodynamic torque is used as the optimal pitch angle, and the control law of pitch control obtained from this can maximize an airfoil aerodynamic torque under current wind conditions, thereby improving utilization ratio of wind energy and self-starting ability by controlling the blades via the pitch control law, which overcomes defects of the prior art.

Figure 3:
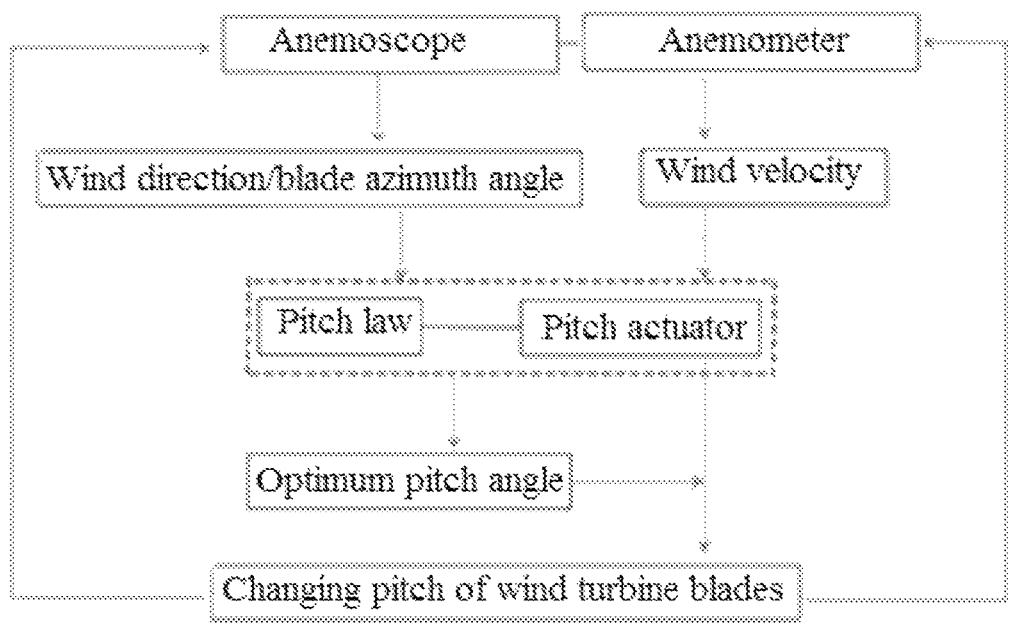
FIG. 3 is a flow chart of pitch control according to an embodiment of the present disclosure.

Referring to FIG. 3, input variables of the expression are a wind velocity $v_{in}$ and a blade azimuth angle Ψ. In addition to these two variables, the expression is also related to constants such as a rotation radius R, a rotation velocity Ω of the blade and aerodynamic coefficients $c_1$, $c_2$ and $c_3$. It is known from common aerodynamic test data of the airfoil that Reynolds number has little influence on the three aerodynamic coefficients $c_1$, $c_2$ and $c_3$, so this expression of the optimal pitch angle is suitable for various wind conditions.

The blade azimuth angle Ψ can be obtained by parameters of the anemoscope 5 and the angle sensor 7, and the wind velocity $v_{in}$ can be directly obtained by the anemometer 6. A calculation result is output to the pitch actuator 3, and the pitch actuator 3 controls the adjustment rods 4 to realize the automatic pitch control of the blades 2, thereby improving universality of pitch control of the blades under different wind conditions. The expression of the pitch control law of the pitch is concise, the calculation time is short, and the response speed is fast, thereby overcoming a defect of the lag of pitch control.

The present embodiment also provides a pitch control system of a symmetrical-airfoil vertical axis wind turbine.

The pitch control system includes the connecting rod 1. Two ends of the connecting rod 1 are provided with the symmetrical blades 2. A center of the connecting rod 1 is provided with a rotation shaft (not shown) vertical to the ground. The rotation shaft is provided with the pitch actuator 3 for controlling the blades 2. The pitch actuator 3 is provided with the adjustment rods 4 connected to the blades 2. The wind turbine is also provided with the anemoscope 5 and the anemometer 6. The connecting rod 1 is provided with the angle sensor 7. Signal output ends of the anemoscope 5, the anemometer 6 and the angle sensor 7 are in communication connection with a controller (not shown). A signal output end of the controller is in communication connection with the pitch actuator 3. The controller controls the pitch angle based on an output of data collected by the anemometer 6, the anemoscope 5 and the angle sensor 7. An expression of the optical pitch angle controlled by the controller is:

$$\theta_p = \Gamma - \frac{2c_2 - \sqrt{4c_2^2 - 12c_1c_3\tan^2\Gamma}}{6c_3\tan\Gamma} \quad \text{(expression 2)}$$

Where $\theta_p$ is an optimal pitch angle, $$\Gamma = \arctan\frac{\cos\Psi}{\sin\Psi - \lambda},$$

Ψ is a blade azimuth angle, i.e., an angle by which a wind direction rotates counterclockwise to an inner normal of an circumference formed by an airfoil;

$$\lambda = \frac{R\Omega}{v_{in}}$$

is a tip velocity ratio, R is a rotation radius, Ω is a rotation velocity, $v_{in}$ is a wind velocity.

$c_1$, $c_2$, and $c_3$ are aerodynamic coefficients in a lift coefficient expression $C_L(\alpha)=c_1\alpha+c_3\alpha^3$ and a drag coefficient expression $C_D(\alpha)=c_0+c_2\alpha^2$, where α is an attack angle, which represents an angle between a relative wind velocity and a chord line of an airfoil, $v_r=v_{in}-R\Omega$.

What is claimed is:

1. A method to control pitch of symmetrical-airfoil blades of a vertical axis wind turbine, the method comprising:
   collecting, by an anemometer communicatively connected to a controller of the vertical axis wind turbine, wind velocity data;
   collecting, by an anemoscope communicatively connected to the controller, wind direction data;
   collecting, by an angle sensor communicatively connected to the controller, rotation data of the blades;
   transmitting, by the anemometer, the wind velocity data to the controller;
   transmitting, by the anemoscope, the wind direction data to the controller;
   transmitting, by the angle sensor, the blade rotation data to the controller;
   determining, by the controller, an optimum pitch angle for the blades, such that $$\theta_p = \Gamma - \frac{2c_2 - \sqrt{4c_2^2 - 12c_1c_3\tan^2\Gamma}}{6c_3\tan\Gamma};$$

wherein $\theta_p$ is the optimal pitch angle, $$\Gamma = \arctan\frac{\cos\Psi}{\sin\Psi - \lambda},$$

is a blade azimuth angle of a respective one of the blades with respect to a rotational direction of the vertical axis wind turbine, the blade azimuth angle being determined based on the data from the anemoscope and the angle sensor, $$\lambda = \frac{R\Omega}{v_{in}}$$

is a tip speed ratio, where R is a rotation radius of the blades, $\Omega$ is a rotation velocity of the blades, and $v_{in}$ is the wind velocity, wherein $c_1$, $c_2$, and $c_3$, are aerodynamic coefficients in a lift coefficient expression $C_L(\alpha) = c_1\alpha + c_3\alpha^3$ and a drag coefficient expression $C_D(\alpha) = c_0 + c_2\alpha^2$; $\alpha$ is an attack angle, which represents an angle between a relative wind velocity $v_r$ and an airfoil chord line, where $v_r = v_{in} - R\Omega$;

transmitting, by the controller, the determined optimal pitch angle to a pitch actuator; and controlling, by the pitch actuator, pitch of the blades based on the received optimal pitch angle.

2. A pitch control system of a symmetrical-airfoil vertical axis wind turbine, comprising:
   a controller;
   a rotation shaft arranged vertically;
   a plurality of symmetrical blades;
   a plurality of connecting rods, one of two ends of each connecting rod being connected with one of the plurality of symmetrical blades, wherein the other one of the two ends of each connecting rod is connected to the rotation shaft;
   a pitch actuator that is provided with adjustment rods connected to the blades and is in communication connection with the controller;
   an angle sensor in communication connection with the controller;
   an anemoscope that collects wind direction data and is in communication connection with the controller; and
   an anemometer that collects wind velocity data and is in communication connection with the controller;
   wherein the controller outputs an optimal pitch angle based on the data collected by the anemoscope and the anemometer, the optimal pitch angle controlled by the pitch actuator being determined by:

$$\theta_p = \Gamma - \frac{2c_2 - \sqrt{4c_2^2 - 12c_1c_3\tan^2\Gamma}}{6c_3\tan\Gamma}$$

wherein $\theta_p$ is the optimal pitch angle, $$\Gamma = \arctan\frac{\cos\Psi}{\sin\Psi - \lambda},$$

where $\Psi$ is a blade azimuth angle of a respective one of the blades with respect to a rotational direction of the vertical axis wind turbine $$\lambda = \frac{R\Omega}{v_{in}}$$

is a tip speed ratio, where R is a rotation radius of the blades, $\Omega$ is a rotation velocity of the blades, $v_{in}$ is a wind velocity; and wherein $c_1$, $c_2$, and $c_3$, are aerodynamic coefficients in a lift coefficient expression $C_L(\alpha) = c_1\alpha + c_3\alpha^3$ and a drag coefficient expression $C_D(\alpha) = c_0 + c_2\alpha^2$, wherein $\alpha$ is an attack angle, which represents an angle between a relative wind velocity $v_r$ and an airfoil chord line, where $v_r = v_{in} - R\Omega$.

3. The pitch control system according to claim 2, wherein the adjustment rods are hydraulic telescopic rods, and a signal output end of the pitch actuator is communicatively connected with a hydraulic system.

* * * * *